(12) United States Patent
Yamanaka et al.

(10) Patent No.: US 6,287,684 B1
(45) Date of Patent: Sep. 11, 2001

(54) TRANSPARENT LABEL

(75) Inventors: Masaaki Yamanaka; Kazumasa Hirano, both of Ibaraki (JP)

(73) Assignee: Oji-Yuka Synthetic Paper Co., Ltd., Tokyo (JP)

(*) Notice: Subject to any disclaimer, the term of this patent is extended or adjusted under 35 U.S.C. 154(b) by 0 days.

(21) Appl. No.: 09/554,885
(22) PCT Filed: Sep. 20, 1999
(86) PCT No.: PCT/JP99/05113
§ 371 Date: Aug. 16, 2000
§ 102(e) Date: Aug. 16, 2000
(87) PCT Pub. No.: WO00/17839
PCT Pub. Date: Mar. 30, 2000

(30) Foreign Application Priority Data
Sep. 22, 1998 (JP) ................................. 10-268498

(51) Int. Cl.$^7$ ........................................... B32B 7/12
(52) U.S. Cl. .................. 428/343; 428/323; 428/515; 428/523; 428/216; 156/229
(58) Field of Search ............................ 428/221, 323, 428/195, 212, 213, 214, 215, 216, 500, 523, 515, 343; 269/975, 980; 156/229

(56) References Cited

U.S. PATENT DOCUMENTS 5,409,754   4/1995   Yasuda et al. .................... 428/43
5,670,225 * 9/1997   Yamanaka et al. ............. 428/40.1

* cited by examiner

Primary Examiner—Blaine Copenheaver
Assistant Examiner—Christopher Paulraj
(74) Attorney, Agent, or Firm—Oblon, Spivak, McClelland, Maier & Neustadt, P.C.

(57) ABSTRACT

Disclosed is a transparent film comprising a substrate layer (A) of a uniaxially stretched film containing 95 to 100 wt % of thermoplastic resin and 0 to 5 wt % of an inorganic or organic fine powder having an average particle size of 0.2 to 2 $\mu$m, a surface layer (B) of a uniaxially stretched film containing 85 to 99 wt % of a thermoplastic resin and 1 to 15 wt % of an inorganic fine powder having an average particle size of 0.7 to 3 $\mu$m and being provided on one surface of the substrate layer (A), and an adhesive layer (C) of a uniaxially stretched film containing 90 to 99 wt % of a thermoplastic resin having a melting point of 80 to 140° C. and containing 1 to 10 wt % of an inorganic or organic fine powder having an average particle size of 0.7 to 3 $\mu$m and being provided on the other surface of the substrate layer (A). The transparent label is characterized in that having an excellent transparency and suitability for in-mold forming.

23 Claims, 1 Drawing Sheet

TRANSPARENT LABEL

TECHNICAL FIELD

Figure 1:
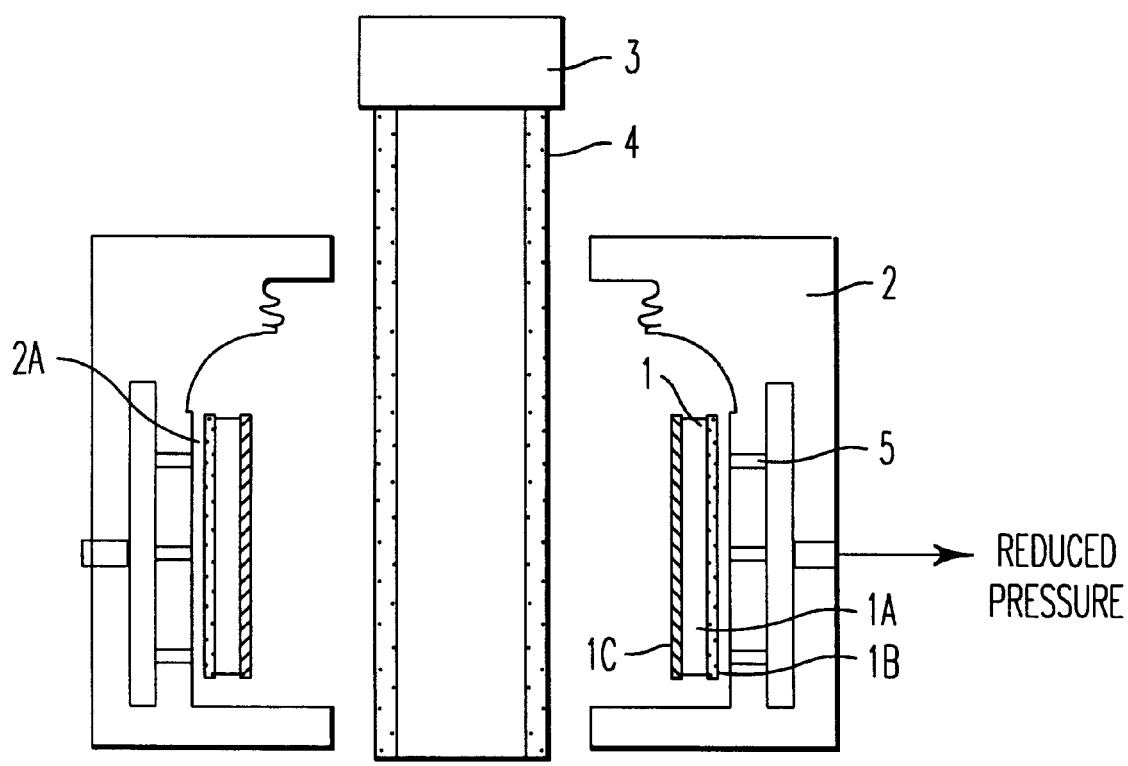

The present invention relates to a transparent label suitable for in-mold forming and method for fabricating thereof.

BACKGROUND ART

The in-mold forming method is known as a method for fabricating, by integral molding, a synthetic resin formed product originally attached with a label. In this method, a label is first placed on the inner wall of the metal mold, and then a forming resin such as polyethylene and polypropylene is directly fed into the metal mold to obtain a formed product by injection molding, hollow molding or in-mold bead foaming. For the case of attaching a label onto polypropylene or polyethylene sheet, the attachment can be effected based on the same principle by a method such as that promoting forming based on differential pressure under heating of the sheet (vacuum molding, differential pressure molding).

A variety of transparent labels have been proposed as available for such in-mold forming. An exemplary transparent label is that obtained by coating on a substrate layer a solution of low-melting-point olefin resins such as ethylene-vinyl acetate copolymer using a gravure coater or the like and by successive drying; where the substrate layer comprises a non-stretched extruded film made of crystalline polypropylene or high-density polyethylene, or a transparent film formed by the calendar process. There are also proposed films such that fabricated by stacking a low-melting-point olefin base resin film on one surface of the substrate layer using an adhesive or by direct extrusion lamination.

This attached label, however, is less attractive in that lacking gross and quality sense since the film composing the substrate layer is of non-stretched type. Another problem is that the film may easily be stretched due to tensile force when it is subjected to gravure printing in a wound-up state, which may result in misalignment of patterns and prevent high-definition printing. Still another problem is that crimping of the film due to lack of its stiffness, which is likely to occur when the label cut into a predetermined size is attached to the inner wall of the metal mold using a robot inserter, so that high-speed attachment of the film will result into failure. Moreover, a label coated or laminated with an adhesive layer requires excessive process steps and, as a result, higher production cost.

On the other hand, as a transparent label for overcoming the foregoing drawbacks, proposed is a label which is fabricated by laminating low-melting-point olefin resin such as a low-density polyethylene or ethylene-vinyl acetate copolymer on a substrate layer comprising a sheet of longitudinally stretched crystalline polypropylene, and by transversely stretching the laminate using a tenter oven. Decorating polyethylene using such label by hollow molding, however, requires a parison temperature of 180° C. or above and a metal mold cooling temperature or 30° C. or above. As for hollow molding of polypropylene, a satisfactory product also cannot be obtained unless the parison temperature is raised as high as 230° C. or above and the metal mold cooling temperature is as high as 30° C. or above. Conditions out of the above ranges will result in generation of blisters which lowers the adhesive strength of the label and prevents practical products from being produced.

To ensure high-speed and low-cost hollow molding of polyethylene (m.p. 108–135° C.) containers, it is desirable in general to lower the parison temperature as possible and shorten the cooling period thereby to shorten the forming cycle. Whereas, treating a transparent label having a substrate layer made of a biaxially stretched film or non-stretched layer film at the above required temperatures will weaken the adhesive strength of the label to cause blisters, and will fail in obtaining practical products.

SUMMARY OF THE INVENTION

For addressing the above problems in the prior art, it is therefore an object of the present invention to provide a transparent label suitable for in-mold forming. That is, the present invention provides a transparent label excellent in transparency, smoothness of an adhesive layer, Clark stiffness, label attachment property, blister suppressing property after in-mold forming and label adhesive property, It is another object of the present invention to provide a sempke and low-cost method for fabricating such a transparent label.

DESCRIPTION OF THE INVENTION

The present inventors found after extensive investigations for solving the foregoing problems that a transparent film can be attached without any problem by in-mold forming by using a label comprising (B) of a uniaxially stretched film, and an adhesive layer (C) of a uniaxially stretched film, each layer having a specific composition, which led us to provide the present invention.

Thus, the present invention provides a transparent film comprising a substrate layer (A) of a uniaxially stretched film containing 95 to 100 wt % of thermoplastic resin and 0 to 5 wt % of an inorganic or organic fine powder having an average particle size of 0.2 to 2 $\mu$m, a surface layer (B) of a uniaxially stretched film containing 85 to 99 wt % of a thermoplastic resin and 1 to 15 wt % of an inorganic fine powder having an average particle size of 0.7 to 3 $\mu$m and is provided on one surface of the substrate layer (A), and an adhesive layer (C) of a uniaxially stretched film containing 90 to 99 wt % of a thermoplastic resin having a melting point of 80 to 140° C. and containing 1 to 10 wt % of an inorganic or organic fine powder having an average particle size of 0.7 to 3 $\mu$m and being provided on the other surface of the substrate layer (A).

In a preferred embodiment of the present invention, the substrate layer (A), surface layer (B) and adhesive layer (C) comprise a film uniaxially stretched by 2 to 8 times. The thermoplastic resin employed herein preferably contains polyolefin resin. The transparent label of the present invention preferably has a longitudinal Clark stiffness of 30 to 250, a transverse Clark stiffness of 10 to 50, an opacity of 20% or below, and a smoothness of the adhesive layer (C) of 100 to 2,500 seconds. The total thickness of the label is preferably 60 to 250 $\mu$m, and a thickness of the surface layer (B) and adhesive layer (C) is 1 to 10 $\mu$m, respectively. The adhesive layer is preferably embossed.

The present invention also provides a method for fabricating a transparent film comprising the steps of: forming, on one side of a substrate layer (A) a surface layer (B) of a uniaxially stretched film containing 85 to 99 wt % of a thermoplastic resin and 1 to 15 wt % of an inorganic fine powder having an average particle size of 0.7 to 3 $\mu$m; the substrate layer (A) being made of a uniaxially stretched film containing 95 to 100 wt % of thermoplastic resin and 0 to 5 wt % of an inorganic or organic fine powder having an average particle size of 0.2 to 2 $\mu$m; forming, on the other surface of the substrate layer (A), an adhesive layer (C) of a uniaxially stretched film containing 90 to 99 wt % of a thermoplastic resin having a melting point of 80 to 140° C. and containing 1 to 10 wt % of an inorganic or organic fine powder having an average particle size of 0.7 to 3 µm; and uniaxially stretching the obtained laminate. The uniaxial stretching is preferably effected by 2 to 8 times based on the difference in the peripheral speeds between the roll groups. Embossing of the adhesive layer (C) preferably precedes the uniaxial stretching.

The above and other objects and features of the invention are apparent to those skilled in the art from the following referred embodiments thereof when considered in conjunction with the accompanied drawing, in which:

FIG. 1 is a sectional view of a forming apparatus used for producing a label-attached, hollow-formed container. In the figure, numeral 1 denotes a label, 1a denotes a substrate layer, 1b denotes a surface layer, 1c denotes an adhesive layer, 2 denotes a metal mold, 2a denotes an inner wall of the metal mold, 3 denotes a die, 4 denotes a parison and 5 denotes a suction hole.

DETAILED DESCRIPTION OF THE INVENTION

The transparent film of the present invention is characterized in that having a surface layer (B) on one side of the substrate layer (A), and having an adhesive layer (C) on the other side thereof. All of these substrate layer (A), surface layer (B) and adhesive layer (C) individually comprise a uniaxially stretched sheet which contains thermoplastic resin, inorganic fine powder or organic fine powder with a specific composition.

There is no special limitation on the kinds of the thermoplastic resin used for the substrate layer (A) and surface layer (B) and examples of which include polyolefin resins; polyamide resins such as nylon-6, nylon-6,6 and nylon-12; thermoplastic polyester resins such as polyethylene terephthalate and its copolymer, polybutylene terephthalate and its copolymer, and aliphatic polyester; polycarbonate; atactic polystyrene; and syndyotactic polystyrene. Among these, non-polar polyolefin resins are preferably used.

Representative examples of the polyolefin resins include homopolymer of α-olefin having a carbon number of 2 to 8 such as ethylene, propylene, 1-butene, 1-hexene, 1-heptene, 1-octene, 4-methyl-1-pentene and 3-methyl-1-pentene; and copolymer of 2 to 5 species selected from such α-olefins.

Either random copolymer or block copolymer is allowable. More specifically, allowable are branched or normal polyethylene having a density of 0.89 to 0.97 g/cm$^3$ and a melt flow rate (190° C., 2.16 kg load) of 1 to 10 g/10 minutes; propylene homopolymer having a melt flow rate (230° C., 2.16 kg load) of 0.2 to 15 g/10 minutes; propylene-ethylene copolymer; propylene-(1-butene) copolymer; propylene-ethylene-(1-butene) copolymer; propylene-(4-methyl-1-pentene) copolymer or propylene-(4-methyl-1-pentene) copolymer. Among these, propylene homopolymer, propylene-ethylene copolymer and high-density polyethylene are preferable in terms of inexpensiveness and good forming property.

While there is no specific limitation on the kinds of the thermoplastic resin used for the adhesive layer (C), it is preferable to use that having a melting point of 80 to 140° C.

For example, available are polyolefin resins such as propylene-ethylene copolymer, high-density polyethylene, middle-density polyethylene, low-density polyethylene, ethylene-vinyl acetate copolymer, ethylene-acrylic ester copolymer, ethylene-methacrylic ester copolymer, ethylene-α-olefin copolymer and metal salts thereof. Among these, preferable are ethylene-base resins such as ethylene-acrylic ester copolymer, ethylene-vinyl acetate copolymer and ethylene-α-olefin copolymer.

For the substrate layer (A), surface layer (B) or adhesive layer (C), one kind of the thermoplastic resin may be selected from those listed above to be used individually, or two or more thereof may be selected to be used in combination. In particular for the case that two or more thereof are used in combination for the adhesive layer (C), it is preferable to use them so that an average melting point, estimated using melting points of individual compound resins and based on the blend ratio by weight thereof, will fall within a range from 80 to 140° C. Either the same resins or different resins can be used for the substrate layer (A), surface layer (B) and adhesive layer (C). Kinds of the thermoplastic resins can properly be selected depending on specific properties required for the individual layers.

There is no special limitation on the kinds of inorganic or organic fine powders used for the substrate layer (A), surface layer (B) and adhesive layer (C).

Examples of the inorganic fine powder include heavy calcium carbonate, precipitated calcium carbonate, fired clay, talc, barium sulfate, diatom-earth, magnesium oxide, zinc oxide, titanium oxide and silicon oxide. Among these, heavy calcium carbonate, fired clay and talc are preferable in terms of inexpensiveness and forming property.

Examples of the organic fine powder include those made of polyethylene terephthalate, polybutylene terephthalate, polyamide, polycarbonate, polyethylene naphthalate, polystyrene, melamine resin, polyethylene sulfite, polyimide, polyethyl ether ketone and polyphenylene sulfite. Among these preferably used are such that having a higher melting point than that of the thermoplastic resin employed, and having non-compatibility.

For the substrate layer (A), surface layer (B) or adhesive layer (C), one kind of the fine powder may be selected from those listed above to be used individually, or two or more thereof may be selected to be used in combination. For the case that two or more thereof are used in combination for the substrate layer (A) or adhesive layer (C), it is allowable to mix the inorganic and organic fine powders.

Either the same resins or different resins can be used for the substrate layer (A), surface layer (B) and adhesive layer (C), provided that the average particle size must be within a range from 0.2 to 2 µm for the substrate layer (A), and from 0.7 to 3 µm for the surface layer (B) and adhesive layer (C). Selecting an average particle size of the fine powder for the substrate layer (A) within the above range will ensure the opacity of the obtained label fall to 20% or below. Selecting an average particle size of the fine powder for the surface layer (B) and adhesive layer (C) within the above range will successfully provide fine cracks or emboss on the surface thereof to improve adhesive property of printing ink and slipping property of the label, and, in particular for the adhesive layer, will prevent an air reservoir (blister) from being generated between the formed product and the label during in-mold forming. As for the surface layer (B), it is preferable to suppress a content of larger particles of 44 µm diameter or above to 10 ppm or below, since such particles can form rough projections causative of white spots during printing.

When fabricating the transparent label of the present invention, the thermoplastic resin and the inorganic or organic fine powder are mixed to form individual layers. The transparent label of the present invention can be fabricated by any combination of various methods known to those skilled in the art. Any transparent label fabricated by any method is included within a scope of the present invention as far as it satisfies the conditions as defined in Claim 1.

Amounts of the thermoplastic resin and inorganic or organic fine powder used for individual layers are limited within specific ranges. For the substrate layer (A), the thermoplastic resin is compounded in an amount of 90 to 100 wt %, and inorganic or organic fine powder in an amount of 0 to 5 wt %. The fine powder exceeding 5 wt % will significantly reduce the transparency of the obtained label.

For the surface layer (B), the thermoplastic resin is compounded in an amount of 85 to 99 wt %, and inorganic fine powder in an amount of 1 to 15 wt %. The inorganic fine powder less than 1 wt % will ruin the adhesive property of the ink and slipping property of the label, whereas exceeding 15 wt % will reduce the transparency of the label while the adhesive property of the ink and slipping property of the label improve.

For the adhesive layer (C), the thermoplastic resin is compounded in an amount of 90 to 99 wt %, and inorganic or organic fine powder in an amount of 1 to 10 wt %. The fine powder less than 1 wt % will reduce the blister suppressing effect during in-mold forming due to an excessively smoothened surface, whereas exceeding 10 wt % will lower the adhesive strength of the in-mold formed label due to relative reduction in the resin component.

It is acceptable to optionally add a dispersant, antioxidant, solubilizing agent or ultraviolet stabilizer when compounding and kneading the thermoplastic resin with inorganic or organic fine powder. Composition for forming the individual layers obtained by the compounding and kneading can be formed into a layer by, for example, extrusion process, where the substrate layer (A), surface layer (B) and adhesive layer (C) may be stacked en bloc by co-extrusion process, or may be laminated after separately extruded. For the case of the separate extrusion, allowable is either process such that laminating the surface layer (B) on the substrate layer (A) and then laminating the adhesive layer (C), or such that laminating the adhesive layer (C) on the substrate layer (A) and then laminating the surface layer (B). It is still allowable to simultaneously laminate the substrate layer (A), surface layer (B) and adhesive layer (C). Moreover, allowable is either process such that the substrate layer (A) and surface layer (B) are co-extruded and then the adhesive layer (C) is laminated, or such that the substrate layer (A) and adhesive layer (C) are co-extruded and then the surface layer (B) is laminated.

Uniaxial stretching is essential for fabricating the transparent label of the present invention. The uniaxial stretching can be performed either before or after the lamination of the individual layers. It is thus acceptable to laminate precedently stretched layers, or to stretch the laminate en bloc after the individual layers are laminated. Or, it is also allowable to laminate precedently stretched layers and to further stretch the laminate. A preferable fabrication method includes the steps of laminating the substrate layer (A), surface layer (B) and adhesive layer (C) and then stretching the laminate en bloc, which is simpler and cheaper as compared with the case of the separate stretching and successive lamination.

A variety of known methods is applicable to the stretching. Stretching temperature, for the case using a non-crystalline thermoplastic resin, can be set at a temperature equal to or higher than a glass transition point thereof; and, for the case using a crystalline resin, can be set within a temperature range from a glass transition point of the non-crystalline domain to the melting point of the crystalline domain, both inclusive.

While there is no special limitation of a method for the stretching, preferable is inter-roll stretching based on difference in the peripheral speeds between the roll groups. This method allows arbitrary selection of stretching times, thereby to afford a transparent film while extremely reducing void likely to generate during the stretching. Since stretching orientation of the resin occurs along the film feeding direction, so that obtained is a transparent label having a higher tensile strength and less dimensional changes due to tension during printing as compared with those of a non-stretched film.

The stretching times can be set within a range from 2 to 8. The stretching times less than 2 will lower the tensile strength along the film feeding direction, and thus cause large dimensional changes during printing and insufficient label stiffness. On the other hand, the stretching times exceeding 8 will result in a frequent breakage of the label during the stretching.

After the stretching, it is also allowable to optionally perform high temperature anneal using heating rolls to effect thermosetting.

The total thickness of the transparent label of the present invention is preferably 60 to 250 $\mu$m, where the total thickness of the label less than 60 $\mu$m will increase the dimensional changes during printing and likely to cause color misalignment during multi-color printing. Such label may degrade its attaching property during high-speed in-mold forming so that in some cases the speed of in-mold forming must inevitably be slowed down. The total label thickness exceeding 250 $\mu$m will increase morphological changes in the in-mold formed products and tends to make it difficult to obtain containers of a desired capacity.

Thicknesses of the surface layer (B) and adhesive layer (C) are preferably 1 to 10 $\mu$m, respectively. A thickness of the surface layer (B) less than 1 $\mu$m tends to degrade printing suitability of the surface layer (B), and a thickness of the adhesive layer (C) less than 1 $\mu$m tends to degrade the adhesion strength. Thicknesses of the surface layer (B) and adhesive layer (C) exceeding 10 $\mu$m tend to lower Clark stiffness or to degrade the transparency.

Printing to the surface layer (B) can be provided according to common methods. For example, pattern, bar code, character information, and scale can properly be printed by purpose of use. Methods for printing include gravure printing, offset printing, flexographic printing, screen printing and seal printing.

The transparent label of the present invention may be subjected to embossing finish. Embossing finish may precede printing although it generally follows printing. The transparent label of the present invention is preferably embossed before printing.

While there is no specific limitation on the method of embossing finish, it is enabled by known press or embossing machine such as a planographic press machine or roll embossing machine by which surface irregularity is produced on an embossing plate by thermocompression. Roll embossing process refers to a method for transferring surface irregularity of a cylindrical embossing plate onto a target material by thermocompression. The thermocompressive transfer can be effected by heating the transparent label to a temperature between the heat deformation temperature and fusing temperature of the resin used in the adhesive layer (C), and then pressing an embossing plate onto the surface of the stretched film made of the thermoplastic resin. Methods for heating include infrared irradiation, hot air blowing, heat conduction mediated by a heating roller and dielectric heating. The embossing using an embossing roll can be performed either before or after the stretching, and also simultaneously with the film forming.

An emboss pattern has 5 to 200 dots or lines per one inch, and more preferably 15 to 120. Depth of a concave of the emboss pattern is ⅓ or more of the thickness of the adhesive layer (C), and more preferably ½ or more, where the concave reaching and intruding the substrate layer (A) also being allowable.

The transparent label of the present invention preferably has an opacity of 20% or below. The term "opacity" used in a context of this specification means that measured in accordance with JIS (Japanese Industrial Standard) Z-8722. The opacity of 20% or below allows the surface of the formed product to be seen clearly through the label. This ensures an integrated appearance of the non-printed transparent portion of the label and the surface of the formed product and can successfully upgrade a quality image of the product. In particular for the formed product having on the surface of which a characteristic pattern or coloring, such label is aesthetically advantageous since it will not affect the original pattern nor coloring. For the case of fabricating a transparent container, such label is convenient since the contents in the container can be seen through the attached label. For example, attachment of a label printed with a scale will be convenient to easily check the amount of contents in the container.

Smoothness of the adhesive layer (C) of the transparent label according to the present invention is preferably within a range from 100 to 2,500 seconds. The term "smoothness" in a context of this specification means that measured in accordance with JIS P-8119. The smoothness of less than 100 seconds tends to reduce a label attachment area, which will result into failure in obtaining a sufficient adhesive strength durable in the practical use. Whereas the smoothness exceeding 2,500 seconds tends to produce blister due to air reserved between a parison and label adhesion surface during in-mold forming.

The Clark stiffness of the transparent label of the present invention is preferably 30 to 250 in the longitudinal direction and 10 to 50 in the transverse direction. The term "Clark stiffness" in a context of this specification means "S" value measured in accordance with JIS P-8143.

If the transversal Clark stiffness is less than 10, the label tends to crimp or dislocate during robot-assisted placement thereof to a predetermined position in the a metal mold, which prevents the label from being correctly attached. Whereas, if the longitudinal Clark stiffness exceeds 250, the label tends to float up from the curved wall surface of the metal mold, thereby to cause drop of the label from the metal mold or significant decrease in the adhesive force between a formed product and the label, which may result in blister generation.

It is recommendable to make the longitudinal direction of the label and trailing direction of the parison coincide with each other. Label attachment property, label adhesive property and anti-blister property will be improved by aligning the parison trailing direction to a direction of higher stiffness of the label, and aligning a direction normal to the parison trailing direction to a direction of lower stiffness.

The transparent label of the present invention is in particular suitable for in-mold forming. In-mold forming using the transparent label of the present invention can be performed according to the common practice. For example, it is possible to directly feed a forming resin into a metal mold, on the inner wall of which the transparent label of the present invention being already placed, and to perform injection molding, hollow molding or in-mold bead foaming. The label is placed so that the surface layer (B) of which comes into contact with the inner wall of the metal mold. The label can be placed by vacuum suction through the holes opened on the inner wall of the metal mold.

There is no specific limitation on the forming resin fed into the metal mold, and can properly be selected depending on target applications, conditions of use and structures of the formed products. Examples of such resin include high-density polyethylene, low-density polyethylene, polypropylene, nylon-6, nylon-6,6, polyethylene terephthalate, polycarbonate, polyphenylene oxide, polyphenylene ether and ethylene-vinyl acetate copolymer.

For the case of forming by hollow forming process, heated parison of a forming resin is trailed, one end of which is fused by fastening the metal mold, a compressed gas is introduced into the parison and allow it to expand. The parison is pressed to the inner wall of the metal mold to be formed into a shape conforming to the metal mold and, in association with this, the adhesive layer (C) of the transparent label is fused thereon. After cooling, the metal mold is opened to release a mold product attached with the transparent label.

For the case of forming by differential pressure molding, at least either of vacuum molding or compressed air molding is applicable. A combined use of vacuum and compressed air moldings is preferable in general, in particular with the aid of plug assisting.

The transparent label of the present invention also allows heat sealing in accordance with a known methods besides in-mold forming, since the label uses on the rear surface thereof a low-melting-point adhesive resin. Thus the transparent label of the present invention is versatile also as a wrapping material and header label. The transparent label of the present invention can beneficially be used in a wide variety of applications.

EXAMPLES

In the paragraphs below, the present invention will further be detailed referring to Comparative Examples and Examples. Materials, amounts of uses, ratios and operations mentioned hereinafter can be altered without departing from the spirit of the present invention, and thus it should be understood that the scope of the present invention is not limited to the specific Examples shown below.

Materials used in the Example and Comparative Example are listed in Table 1.

TABLE 1

| Materials | Description |
| --- | --- |
| Polyolefin (a) | propylene homopolymer, m.p. 164° C. (DSC peak temperature) (product of Mitsubishi Chemical Corporation) |
| Polyolefin (b) | ethylene-propylene copolymer, m.p. 142° C. (DSC peak temperature) (product of Mitsubishi Chemical Corporation) |
| Polyolefin (c) | high-density polyethylene, m.p. 134° C. (DSC peak temperature) (product of Mitsubishi Chemical Corporation) |
| Polyolefin (d) | linear low-density polyethylene, m.p. 128° C. (DSC |

TABLE 1-continued

| Materials | Description |
|---|---|
| | peak temperature) (product of Mitsubishi Chemical Corporation) |
| Polyolefin (e) | low-density polyethylene, m.p. 108° C. (DSC peak temperature) (product of Mitsubishi Chemical Corporation) |
| Polyolefin (f) | ethylene-(1-hexene) copolymer, m.p. 100° C. (DSC peak temperature) (product of Nihon Polychem Co., Ltd.) |
| Inorganic fine powder (a) | wet-ground heavy calcium carbonate, average particle size = 0.4 μm (product of Phimatech Co., Ltd.) |
| Inorganic fine powder (b) | wet-ground heavy calcium carbonate, average particle size = 0.8 μm (product of Phimatech Co., Ltd.) |
| Inorganic fine powder (c) | dry-ground heavy calcium carbonate, average particle size = 1.8 μm (product of Shiroishi Calcium Co., Ltd.) |
| Inorganic fine powder (d) | dry-ground heavy calcium carbonate, average particle size = 2.8 μm (product of Shiroishi Calcium Co., Ltd.) |
| Inorganic fine powder (e) | wet-ground heavy calcium carbonate, average particle size = 3.3 μm (product of Shiroishi Calcium Co., Ltd.) |
| Inorganic fine powder (f) | synthetic calcium carbonate (colloidal calcium carbonate), average particle size = 0.15 μm (product of Shiroishi Kogyo K.K.) |

Example and Comparative Example

The transparent labels of the present invention (Examples 1 to 9) and comparative transparent labels (Comparative Examples 1 to 4) were fabricated according to the procedures described below. Types and amount of use of the materials employed, thicknesses of the individual layers (A)/(B)/(C), stretching conditions and stretching property were listed in Table 2.

Polyolefin-base resin and inorganic fine powder were mixed to obtain compounds [A], [B] and [C]. The compounds [A], [B] and [C] were separately fused and kneaded using three extruders conditioned at 230° C., 230° C. and 180° C., respectively, the compounds [B] and [C] were then laminated within the die on the front and rear surfaces of the compound [A], respectively, the obtained laminate was extruded, cooled to 70° C., thereby to obtain a three-layered non-stretched sheet. The sheet was heated to a predetermined temperature and then longitudinally stretched by predetermined times by the inter-roll stretching process. In Examples 8 and 9, the sheets were, in advance of the stretching, passed through the embossing rolls comprising a metal roll and rubber role to emboss dots of 50 μm depth at intervals of 0.3 mm (80 lines per one inch) on the surface of the compound [C]. The stretching was not performed in Comparative Example 3. In Comparative Example 4, the inter-roll longitudinal stretching was followed by transverse stretching using a tenter oven (biaxial stretching). The surface layer side of the obtained sheet was then subjected to corona treatment at 50 W/m² minute using a discharge treatment apparatus (product of Kasuga Electric Works Ltd.) to obtain a three-layered label.

TABLE 2

| Layer | Poly-olefin type | wt % | Fine powder type | wt % | Thickness of layer (μm) | Stretching conditions temp (° C.) | stretching times | Stretching property |
|---|---|---|---|---|---|---|---|---|
| Example 1 | | | | | | | | |
| (B) | (a) | 92 | (d) | 8 | 2 | 120 | 6 | good |
| (A) | (a) | 99 | (a) | 1 | 86 | | | |
| (C) | (e) | 92 | (d) | 8 | 2 | | | |
| Example 2 | | | | | | | | |
| (B) | (a) | 98 | (d) | 2 | 8 | 120 | 6 | good |
| (A) | (a) | 96 | (a) | 4 | 74 | | | |
| (C) | (e) | 98 | (d) | 2 | 8 | | | |
| Example 3 | | | | | | | | |
| (B) | (a) | 92 | (b) | 8 | 4 | 140 | 3 | good |
| (A) | (a) | 99 | (a) | 1 | 132 | | | |
| (C) | (e) | 92 | (b) | 8 | 4 | | | |
| Example 4 | | | | | | | | |
| (B) | (a) | 92 | (b) | 8 | 5 | 130 | 7 | good |
| (A) | (a) | 99 | (c) | 1 | 80 | | | |
| (C) | (e) | 92 | (b) | 8 | 5 | | | |
| Example 5 | | | | | | | | |
| (B) | (b) | 92 | (b) | 8 | 5 | 120 | 4 | good |
| (A) | (b) | 99 | (c) | 1 | 120 | | | |
| (C) | (f) | 92 | (b) | 8 | 5 | | | |
| Example 6 | | | | | | | | |
| (B) | (c) | 95 | (c) | 5 | 5 | 125 | 4 | good |
| (A) | (c) | 100 | | 0 | 200 | | | |

TABLE 2-continued

| Layer | Poly-olefin type | wt % | Fine powder type | wt % | Thickness of layer (μm) | Stretching conditions temp (° C.) | stretching times | Stretching property |
|---|---|---|---|---|---|---|---|---|
| (C) Example 7 | (f) | 95 | (c) | 5 | 5 | | | |
| (B) | (d) | 95 | (c) | 5 | 5 | 115 | 4 | good |
| (A) | (d) | 100 | | 0 | 150 | | | |
| (C) Example 8 | (f) | 95 | (c) | 5 | 5 | | | |
| (B) | (a) | 92 | (b) | 8 | 8 | 120 | 4 | good |
| (A) | (a) | 99 | (c) | 1 | 74 | | | |
| (C) Example 9 | (e) | 92 | (b) | 8 | 8 | | | |
| (B) | (b) | 92 | (b) | 8 | 5 | 120 | 5 | good |
| (A) | (b) | 99 | (c) | 1 | 80 | | | |
| (C) Comparative Example 1 | (f) | 92 | (b) | 8 | 5 | | | |
| (B) | (a) | 92 | (e) | 8 | 5 | 120 | 6 | no good (note) |
| (A) | (a) | 96 | (f) | 4 | 80 | | | |
| (C) Comparative Example 2 | (b) | 92 | (e) | 8 | 5 | | | |
| (B) | (a) | 100 | | 0 | 1 | 120 | 6 | good |
| (A) | (a) | 92 | (d) | 8 | 88 | | | |
| (C) Comparative Example 3 | (e) | 100 | | 0 | 1 | | | |
| (B) | (a) | 92 | (d) | 8 | 5 | no stretching | | |
| (A) | (a) | 96 | (a) | 4 | 80 | | | |
| (C) Comparative Example 4 | (e) | 92 | (d) | 8 | 5 | | | |
| (B) | (a) | 92 | (d) | 8 | 5 | biaxial stretching longitudinal: 140 transverse: 150 | | good |
| (A) | (a) | 96 | (a) | 4 | 80 | | | |
| (C) | (e) | 92 | (d) | 8 | 5 | | | |

(note) A lot of agglomerative projections and occasional breakage observed.

Test Examples

The obtained label was tested and evaluated as follows.
1) Measurement of Physical Properties of the Label
Opacity of the label was measured according to JIS Z-8722. Smoothness of the adhesive layer was measured according to JIS P-8119 and Clark stiffness according to JIS P-8143.
2) In-mold Forming (Fabrication of Hollow Container) and Evaluation
The label was cut into 70 mm long and 60 mm wide, and then, as shown in FIG. 1, placed in a metal mold 2 (25° C.) so as to contact the surface layer 1b with the inner wall 2a of the metal mold 2, and fixed by vacuum suction through vacuum suction holes 5. Then performed was label-attachable hollow forming using a high-density polyethylene HB-330 (product of Mitsubishi Chemical Corporation) at a parison temperature of 180° C. and a shot cycle of 12 seconds, thereby to obtain a label-attached polyethylene container. Also a label-attached polypropylene container was obtained in a similar manner by label-attachable hollow forming using polypropylene EA-7 (product of Mitsubishi Chemical Corporation) at a parison temperature of 210° C. and a shot cycle of 12 seconds.

Label attaching property by the forming, occurrence of blister and label adhesive strength of the label-attached hollow container thus obtained were evaluated or measured by the methods described below.
2-1) Label Adhesive (Insertion) Property
States of the label attachment resulted from each 100 shots of hollow molding were judged by the criteria as below:
 ○: all labels attached to a predetermined position without problem,
 Δ: no drop but dislocation of the labels, undesirable for the practical use, and
 X: drop and dislocation of the labels observed during the attachment.
2-2) Occurrence of Blister
State of the occurrence of blister in the label attached to each container was judged according to the criteria below, and evaluated by a total point for 20 containers (maximum 100 points):

5 points: no blister observed, 4 points: blister observed in less than 10% of the label area, 3 points: blister observed in 10% or more and less than 20% of the label area, 2 points: blister observed in 20% or more and less than 50% of the label area, and 1 point: blister observed in 50% or more of the label area.

2-3) Adhesive Strength of the Label

Four test pieces of 15 mm wide were cut out from the label-attached portion of the container, and peeling strength of the labels were measured using a tension tester Model RTM (product of Orientech Co., Ltd.) to obtain an average value.

Results of the individual tests were shown in Table 3.

TABLE 3

|  | Opacity (%) | Smoothness of Adhesive Layer (C) (sec) | Clark stiffness | | Label Adhesive Property | Polyethylene Container | | Polypropylene Container | |
|---|---|---|---|---|---|---|---|---|---|
|  |  |  | Longitudinal | Transverse |  | Blister | Adhesive strength | Blister | Adhesive strength |
| Example 1 | 10 | 300 | 38 | 18 | ○ | 98 | 500 | 97 | 450 |
| Example 2 | 13 | 500 | 36 | 17 | ○ | 100 | 750 | 99 | 550 |
| Example 3 | 16 | 1200 | 100 | 35 | ○ | 100 | 650 | 100 | 610 |
| Example 4 | 12 | 1800 | 36 | 15 | ○ | 99 | 620 | 99 | 510 |
| Example 5 | 17 | 1500 | 85 | 26 | ○ | 100 | 800 | 100 | 750 |
| Example 6 | 19 | 1000 | 220 | 48 | ○ | 100 | 900 | 100 | 850 |
| Example 7 | 16 | 1300 | 170 | 42 | ○ | 100 | 840 | 100 | 810 |
| Example 8 | 13 | 120 | 34 | 14 | ○ | 100 | 480 | 100 | 400 |
| Example 9 | 11 | 200 | 32 | 13 | ○ | 100 | 650 | 100 | 520 |
| Comparative Example 1 | 13 | 90 | 33 | 13 | ○ | 45 | 30 | 85 | 200 |
| Comparative Example 2 | 25 | 5000 | 38 | 16 | Δ (note) | 70 | 80 | 75 | 100 |
| Comparative Example 3 | 9 | 150 | 15 | 14 | X | 98 | 550 | 95 | 450 |
| Comparative Example 4 | 50 | 9000 | 31 | 60 | ○ | 80 | 150 | 78 | 50 |

(note) Two labels were fed in a stacked manner due to inter-label blocking.
(unit of adhesive strength: g/15 mm width)

As is clear from Table 3, the transparent labels of the present invention have opacity, smoothness of the adhesive layer (C) and Clark stiffness within preferable ranges and gave desirable results in all items of label adhesive property during the hollow forming, blister suppressive property at the time of the attachment onto the formed container, and label adhesive strength.

On the contrary, the label (Comparative Example 1) using synthetic calcium carbonate with an average particle size of 0.15 $\mu$m for the substrate layer (A), and heavy calcium carbonate with an average particle size of 3.3 $\mu$m for the surface layer (B) and adhesive layer (C) showed a significant occurrence of blister since a low smoothness of the adhesive layer (C) resulted in a weaker adhesive strength between the label and the container. Breakage of the label during the stretching was also frequently observed, which was ascribable to a lot of secondary aggregates formed in the substrate layer (A) due to poor dispersion.

Any of the labels such that being produced without using the inorganic fine powder for the adhesive layer (C) and surface layer (B) (Comparative Example 2), being not stretched (Comparative Example 3) and being biaxially stretched (Comparative Example 4) was poor in the properties and lacked practical value.

Industrial Applicability

The transparent label of the present invention has an excellent transparency and is suitable for in-mold forming.

Thus the label of the present invention is available as an in-mold label in, not only hollow molding, but also in injection molding, differential pressure molding and press forming, which ensures versatility and excellet industrial applicability thereof.

According to the method of the present invention, such label can be fabricated with ease.

What is claimed is:

1. A transparent label comprising a substrate layer (A) of a uniaxially stretched label containing 95 to 100 wt % of thermoplastic resin and 0 to 5 wt % of an inorganic or organic fine powder having an average particle size of 0.2 to 2 $\mu$m, a surface layer (B) of a uniaxially stretched label containing 85 to 99 wt % of a thermoplastic resin and 1 to 15 wt % of an inorganic fine powder having an average particle size of 0.7 to 3 $\mu$m and being provided on one surface of the substrate layer (A), and an adhesive layer (C) of a uniaxially stretched label containing 90 to 99 wt % of a thermoplastic resin having a melting point of 80 to 140° C. and 1 to 10 wt % of an inorganic or organic fine powder having an average particle size of 0.7 to 3 $\mu$m and being provided on the other surface of the substrate layer (A), wherein said label is uniaxially stretched by 2 to 8 times.

2. A transparent label as claimed in claim 1, wherein the thermoplastic resin comprises a polyolefin resin.

3. A transparent label as claimed in claim 1, wherein the thermoplastic resin in the adhesive layer (C) is an ethylene-base resin.

4. A transparent label as claimed in claim 3, wherein the thermoplastic resin in the adhesive layer (C) is selected from the group consisting of ehylene-acrylic acid copolymer, ethylene-vinyl acetate copolymer and ethylene-α-olefin copolymer.

5. A transparent label as claimed in claim 1, wherein the inorganic fine powder is selected from the group consisting of heavy calcium carbonate, precipitated calcium carbonate, fired clay and talc.

6. A transparent label as claimed in claim 1, wherein the organic fine powder has a higher melting point than that of the thermoplastic resin and is non-compatible.

7. A transparent label as claimed in claim 1, wherein a content of the organic fine powder having a particle size of 44 $\mu$m or above is 10 ppm or below.

8. A transparent label as claimed in claim 1, wherein the label has a longitudinal Clark stiffness of 30 to 250, and transverse Clark stiffness of 10 to 50.

9. A transparent label as claimed in claim 1, wherein the label has an opacity of 20% or below.

10. A transparent label as claimed in claim 1, wherein the adhesive layer (C) has a smoothness of 100 to 2,500 seconds.

11. A transparent label as claimed in claim 1, wherein the total thickness of the label is 60 to 250 μm.

12. A transparent label as claimed in claim 1, wherein the surface layer (B) and adhesive layer (C) respectively have a thickness of 1 to 10 μm.

13. A transparent label as claimed in claim 1, wherein the label is applicable to in-mold forming.

14. A transparent label as claimed in claim 1, wherein the thermoplastic resin in the substrate layer (A) and surface layer (B) is selected from the group consisting of propylene homopolymer, propylene-ethylene copolymer and high-density polyethylene.

15. A transparent label as claimed in claim 1, wherein the surface layer (B) has a print.

16. A transparent label as claimed in claim 1, wherein the adhesive layer (C) has an embossing finish.

17. A method for fabricating a transparent label, wherein said process comprises:
  (1) forming a layer of a film comprising 85 to 99 wt % of a thermoplastic resin and 1 to 15 wt % of an inorganic fine powder having an average particle size of 0.7 to 3 μm on a first surface of a substrate, said substrate comprising 95 to 100 wt % of thermoplastic resin and 0 to 5 wt % of an inorganic or organic fine powder having an average particle size of 0.2 to 2 μm;
  (2) forming a layer of a film comprising 90 to 99 wt % of a thermoplastic resin having a melting point of 80 to 140° C. and comprising 1 to 10 wt % of an inorganic or organic fine powder having an average particle size of 0.7 to 3 μm on a second surface of said substrate; to obtain a laminate, wherein:
    (a) said film comprising 85 to 99 wt % of a thermoplastic resin and 1 to 15 wt % of an inorganic fine powder having an average particle size of 0.7 to 3 μm; said substrate; and said film comprising 90 to 99 wt % of a thermoplastic resin having a melting point of 80 to 140° C. and comprising 1 to 10 wt % of an inorganic or organic fine powder having an average particle size of 0.7 to 3 μm are uniaxially stretched by 2 to 8 times prior to said obtaining of said laminate; or
  (b) said laminate is uniaxially stretched by 2 to 8 times, to obtain a transparent label comprising:
    (A) a substrate layer of a uniaxially stretched film comprising 95 to 100 wt % of thermoplastic resin and 0 to 5 wt % of an inorganic or organic fine powder having an average particle size of 0.2 to 2 μm;
    (B) a surface layer of a uniaxially stretched film comprising 85 to 99 wt % of a thermoplastic resin and 1 to 15 wt % of an inorganic fine powder having an average particle size of 0.7 to 3 μm on a first surface of said substrate layer; and
    (C) an adhesive layer of a uniaxially stretched film comprising 90 to 99 wt % of a thermoplastic resin having a melting point of 80 to 140° C. and comprising 1 to 10 wt % of an inorganic or organic fine powder having an average particle size of 0.7 to 3 μm on a second surface of said substrate layer.

18. The method of claim 17, wherein said film comprising 85 to 99 wt % of a thermoplastic resin and 1 to 15 wt % of an inorganic fine powder having an average particle size of 0.7 to 3 μm; said substrate; and said film comprising 90 to 99 wt % of a thermoplastic resin having a melting point of 80 to 140° C. and comprising 1 to 10 wt % of an inorganic or organic fine powder having an average particle size of 0.7 to 3 μm are uniaxially stretched prior to said obtaining of said laminate.

19. The method of claim 18, wherein said uniaxial stretching is based on difference in the peripheral speeds between roll groups.

20. The method of claim 18, wherein embossing of the adhesive layer (C) precedes the uniaxial stretching.

21. The method of claim 17, wherein said laminate is uniaxially stretched.

22. The method of claim 21, wherein said uniaxial stretching is based on difference in the peripheral speeds between roll groups.

23. The method of claim 21, wherein embossing of the adhesive layer (C) precedes the uniaxial stretching.

* * * * *